US012606027B2

(12) United States Patent
Badawi et al.

(10) Patent No.: US 12,606,027 B2
(45) Date of Patent: Apr. 21, 2026

(54) HIGH VOLTAGE TO LOW VOLTAGE POWER CONVERSION SYSTEM FOR HIGH VOLTAGE POST IMPACT ELECTRICAL INTEGRITY AND DISCHARGE SYSTEM

(71) Applicant: GM Global Technology Operations LLC, Detroit, MI (US)

(72) Inventors: Ranya Badawi, Rochester Hills, MI (US); Suhan Woo, Rochester Hills, MI (US); Dae Young Kim, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 18/676,924

(22) Filed: May 29, 2024

(65) Prior Publication Data

US 2025/0368047 A1 Dec. 4, 2025

(51) Int. Cl.
B60L 3/04 (2006.01)

(52) U.S. Cl.
CPC ..................................... B60L 3/04 (2013.01)

(58) Field of Classification Search
CPC ........................................................ B60L 3/04
See application file for complete search history.

(56) References Cited

U.S. PATENT DOCUMENTS

| | | | | |
|---|---|---|---|---|
| 7,880,326 B2 * | 2/2011 | Khan | ........................ | B60L 1/00 307/45 |
| 2003/0128556 A1 * | 7/2003 | Zhang | ............... | H02M 3/33584 363/21.06 |
| 2024/0088665 A1 * | 3/2024 | Giri | ........................ | B60L 53/55 |

FOREIGN PATENT DOCUMENTS

| | | | |
|---|---|---|---|
| DE | 102020007869 A1 | 3/2021 | |
| DE | 102020132649 A1 * | 6/2022 | ............... H02J 1/10 |

OTHER PUBLICATIONS

German Office Action for German Application No. 102024121359.0; dated Feb. 21, 2025; 12 pages.

* cited by examiner

*Primary Examiner* — Daniel Cavallari
*Assistant Examiner* — Duc M Pham
(74) *Attorney, Agent, or Firm* — CANTOR COLBURN LLP

(57) ABSTRACT

A vehicle includes a system for operating the vehicle. The system includes a high voltage power source, a first Accessory Power Module (APM) that converts power between high voltage and low voltage, a first switch for controlling a connection between the high voltage power source and the first APM, a second APM that converts power between high voltage and low voltage, a second switch for controlling a connectivity between the high voltage power source and the second APM, an On Board Charging Module (OBCM) connected to the first APM between the first switch and the first APM, a sensor for detecting an impact event at the vehicle and generating a signal upon detecting the impact event, and a processor. The processor receives the signal from the sensor and places the first switch in an open configuration and the second switch in a closed configuration in response to the signal.

20 Claims, 7 Drawing Sheets

1

HIGH VOLTAGE TO LOW VOLTAGE POWER CONVERSION SYSTEM FOR HIGH VOLTAGE POST IMPACT ELECTRICAL INTEGRITY AND DISCHARGE SYSTEM

The subject disclosure relates to electrical systems in vehicles, and in particular to a system and method for operating a power conversion device of an electrical system of a vehicle to ensure electrical integrity in the event of an impact at the vehicle.

Electrical vehicles are being designed with high voltage power sources that provide power to high voltage loads and low voltages sources that provide power to low voltage loads. A power conversion device can be connected between a high voltage power source and a low voltage source to allow charging of the low voltage source and/or to provide power conversion from the high voltage source to voltages suitable for the low voltage loads. In the event of an impact at the vehicle, current through high voltage loads can be of concern. Accordingly, it is desirable to provide a system and method that maintains various low voltage loads operable after an impact while preventing high voltage current from flowing throughout the vehicle.

SUMMARY

In one exemplary embodiment, a method of operating a vehicle is disclosed. The method includes receiving a signal at a sensor of the vehicle during an impact event at the vehicle and switching a configuration of a first switch and a second switch of an electrical power system of the vehicle in response to receiving the signal. The electrical power system includes a high voltage power source, a first Accessory Power Module (APM) that converts between high voltage and low voltage, the first switch for controlling a connection between the high voltage power source and the first APM, a second APM that converts between high voltage and low voltage, the second switch for controlling a connectivity between the high voltage power source and the second APM, and an On Board Charging Module (OBCM) connected to the first APM between the first switch and the first APM. Switching the configuration includes placing the first switch in an open configuration and placing the second switch in a closed configuration.

In addition to one or more of the features described herein, the method further includes operating a low voltage load via the second APM after the impact event, with the first switch open and the second switch closed.

In addition to one or more of the features described herein, wherein a high voltage positive bus line connects the high voltage power source to the first APM, the method further includes discharging the high voltage positive bus line via the first APM after the impact event, with the first switch in the open configuration and the second switch in the closed configuration.

In addition to one or more of the features described herein, the method further includes operating the vehicle in a propulsion mode by placing both the first switch and the second switch in the closed configuration.

In addition to one or more of the features described herein, the method further includes charging the high voltage power source by placing the first switch in the closed configuration and placing the second switch in the open configuration.

In addition to one or more of the features described herein, the method further includes performing current balancing between first APM and the second APM.

In addition to one or more of the features described herein, the sensor is a pyro switch disposed along a first high voltage negative bus between the high voltage power source and the first APM.

In another exemplary embodiment, a system for operating a vehicle is disclosed. The system includes a high voltage power source, a first Accessory Power Module (APM) that converts between high voltage and low voltage, a first switch for controlling a connection between the high voltage power source and the first APM, a second APM that converts between high voltage and low voltage, a second switch for controlling a connectivity between the high voltage power source and the second APM, an On Board Charging Module (OBCM) connected to the first APM between the first switch and the first APM, a sensor for detecting an impact event at the vehicle and generating a signal upon detecting the impact event, and a processor. The processor is configured to receive the signal from the sensor and place the first switch in an open configuration and the second switch in a closed configuration in response to the signal.

In addition to one or more of the features described herein, the processor is further configured to place the first switch in the closed configuration and the second switch in the closed configuration to operate the vehicle in a propulsion mode of operation of the vehicle.

In addition to one or more of the features described herein, the processor is further configured to place the first switch in the closed configuration and the second switch in the open configuration to operate the vehicle in a charging mode.

In addition to one or more of the features described herein, the processor is further configured to place the first switch in the open configuration and the second switch in the open configuration to allow heating of the high voltage power source of the vehicle via the OBCM.

In addition to one or more of the features described herein, the processor is further configured to place the first switch in the open configuration and the second switch in the closed configuration upon receiving a key-off signal.

In addition to one or more of the features described herein, the first APM and the second APM are configured to perform current balancing.

In addition to one or more of the features described herein, the system further includes a pyro switch that disconnects the first APM from the high voltage power source in response to the impact event.

In yet another exemplary embodiment, a vehicle is disclosed. The vehicle includes a high voltage power source, a low voltage power source, a first Accessory Power Module (first APM) connected between the high voltage power source and the low voltage power source, wherein the first APM converts between high voltage and low voltage, a first switch for controlling a connection between the high voltage power source and the first APM, a second APM connected between the high voltage power source and the low voltage power source, wherein the second APM converts between high voltage and low voltage, a second switch for controlling a connectivity between the high voltage power source and the second APM, an On Board Charging Module (OBCM) connected to the first APM between the first switch and the first APM, a sensor for detecting an impact event at the vehicle and generating a signal upon detecting the impact event, and a processor. The processor is configured to receive the signal from the sensor and place the first switch in an open configuration and the second switch in a closed configuration in response to the signal.

In addition to one or more of the features described herein, the processor is further configured to place the first switch in the closed configuration and the second switch in the closed configuration to operate the vehicle in a propulsion mode of operation of the vehicle.

In addition to one or more of the features described herein, the processor is further configured to place the first switch in the closed configuration and the second switch in the open configuration to operate the vehicle in a charging mode.

In addition to one or more of the features described herein, the processor is further configured to place the first switch in the open configuration and the second switch in the open configuration to allow heating of the high voltage power source of the vehicle via the OBCM.

In addition to one or more of the features described herein, the processor is further configured to place the first switch in the open configuration and the second switch in the closed configuration upon receiving a key-off signal.

In addition to one or more of the features described herein, the vehicle further includes a pyro switch that disconnects the first APM from the high voltage power source in response to the impact event.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
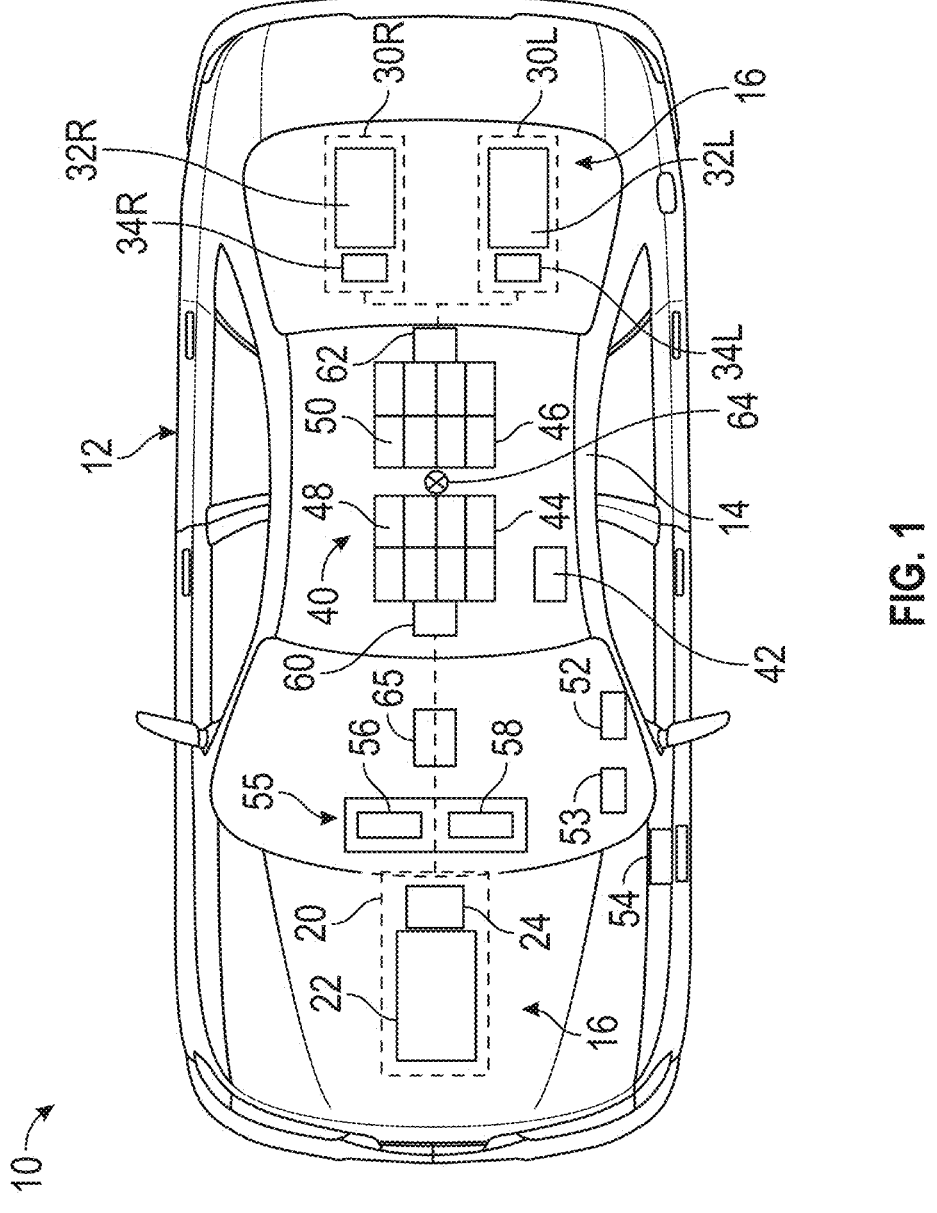
FIG. 1 shows an embodiment of a vehicle, in an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an accessory power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a first plurality of battery modules 48, and the second battery pack 46 includes a second plurality of battery modules 50. Each of the first plurality of battery modules 48 and the second plurality of battery modules 50 includes a number of individual cells (not shown).

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power source. A second OBCM 53 may be included for DC charging (e.g., DC fast charging or DCFC).

In an embodiment, the switching system includes a first switching device 60 that selectively connects to the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit, and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In an alternative embodiment, the vehicle 10 can be an internal combustion engine vehicle, a hybrid vehicle, etc.

Figure 2:
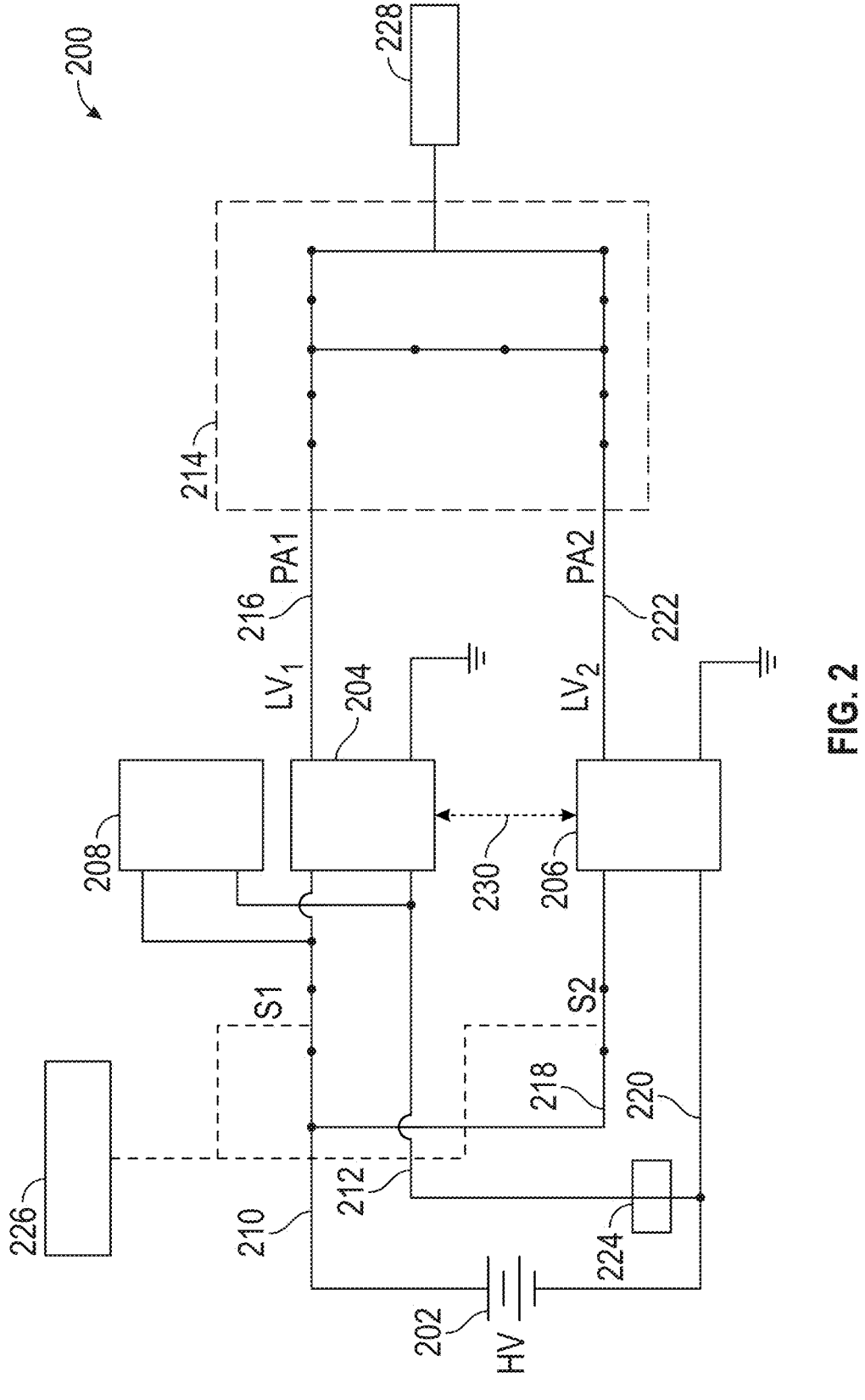
FIG. 2 shows a power conversion system of the vehicle.

FIG. 2 shows a power conversion system 200 of the vehicle 10. The power conversion system 200 includes a circuit having a high voltage power source (HV power source 202), such as a Rechargeable Energy Storage System (RESS), a first Accessory Power Module (first APM 204) for converting between high voltage and low voltage, a second APM 206 for converting between high voltage and low voltage, and an On-Board Charging Module (OBCM 208) for charging the HV power source.

The first APM 204 has a high voltage side and a low voltage side. At the high voltage side, a first HV positive bus line 210 and a first HV negative bus line 212 connects the first APM 204 to the HV power source 202. A first switch S1 is disposed on the first HV positive bus line 210 and is switchable between a first (closed) configuration and a second (open) configuration to control a first connection between the first APM 204 and the HV power source 202. On the low voltage side, the first APM 204 is connected to a power aggregator 214 via a first low voltage positive bus line 216.

The OBCM 208 is connected to the first HV positive bus line 210 and the first HV negative bus line 212. The OBCM 208 is connected to the first HV positive bus line 210 between the first switch S1 and the first APM 204.

The second APM 206 has a high voltage side and a low voltage side. At the high voltage side, a second HV positive bus line 218 and a second HV negative bus line 220 connects the second APM 206 to the HV power source 202. A second switch S2 is disposed on the second HV positive bus line 218 and is switchable between a first (closed) configuration and a second (open) configuration to control a second connection between the HV power source 202 and the second APM 206. On the low voltage side, the second APM 206 is connected to the power aggregator 214 via a second low voltage positive bus line 222. The power aggregator 214 can connect the first APM 204 and the second APM 206 to one or more low voltage batteries 228. The switches can be mechanical switches or solid-state switches controlled by applied voltages.

A sensor 224 is disposed on the first HV negative bus line 212. The sensor 224 can be a pyro switch that opens the connection along the first HV negative bus line 212 when an impact occurs at a force greater than a selected force threshold. The sensor 224 can provide a signal for opening the switch S1 when the impact is greater than the force threshold.

A processor 226 controls the configurations of the first switch and the second switch, thereby controlling operation of the first APM 204 and the second APM 206. The switch configurations can be selected based on a mode of operation from the vehicle. Operation modes and their related switch configurations are shown in Table 1.

TABLE 1

| S1 | S2 | Operating Mode |
|----|----|----|
| 1 | 1 | Propulsion |
| 1 | 0 | AC/DC Charging |
| 0 | 0 | Cold Battery Heating |
| 0 | 1 | LV Battery Failure - HV Main Active Discharge |
| 0 | 1 | LV Battery Failure - Post Impact Electrical Integrity |
| 0 | 1 | Key-Off |

In addition, the first APM 204 and the second APM 206 can communicate with each other, as shown by communication line 230, to share operation during various modes of operation of the vehicle. In particular, the first APM 204 and the second APM 206 can communicate to facilitate current balancing between them. Details of the operating modes are discussed herein with respect to FIGS. 3-7.

Figure 3:
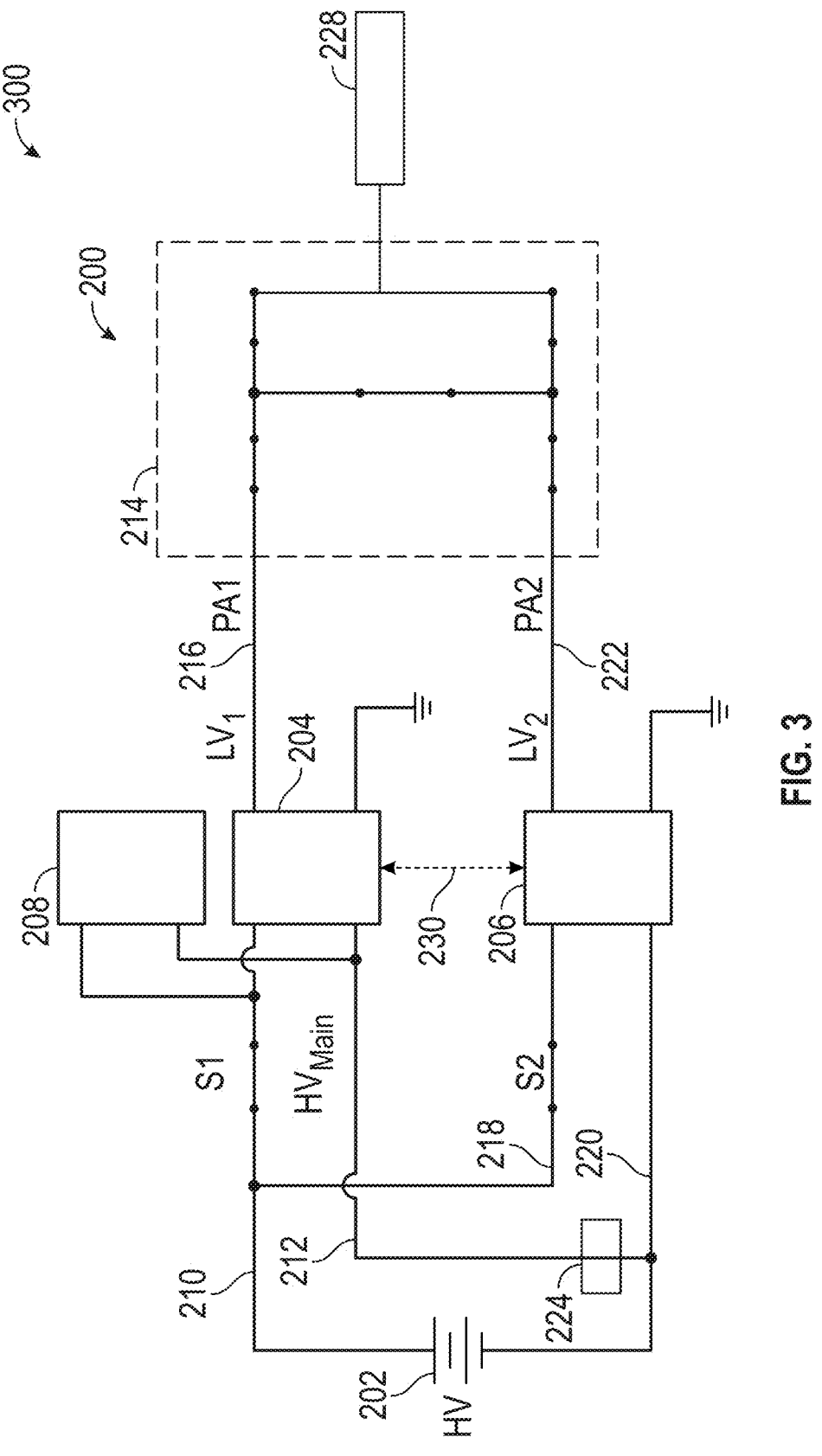
FIG. 3 is a diagram illustrating the power conversion system of FIG. 2 in a propulsion mode of operation.

FIG. 3 is a diagram 300 illustrating the power conversion system 200 in a propulsion mode of operation. The propulsion mode of operation involves propulsion of the vehicle 10 during normal operation (Row 2 of Table 1). In the propulsion mode, the first switch S1 and the second switch S2 are both placed in a closed configuration. The HV power source 202 therefore powers both the first APM 204 and the second APM 206.

During the propulsion mode, the first APM 204 and the second APM 206 can communicate with each other to share electrical loads. The first APM 204 and the second APM 206 can operate in either an interleaved mode (to meet high power requirements for the vehicle) or independently (to allow redundant power). The OBCM 208 can also be used to charge the HV power source 202 and/or to charge one or more low voltage batteries 228 or power low voltage loads (not shown) during the propulsion mode.

Figure 4:
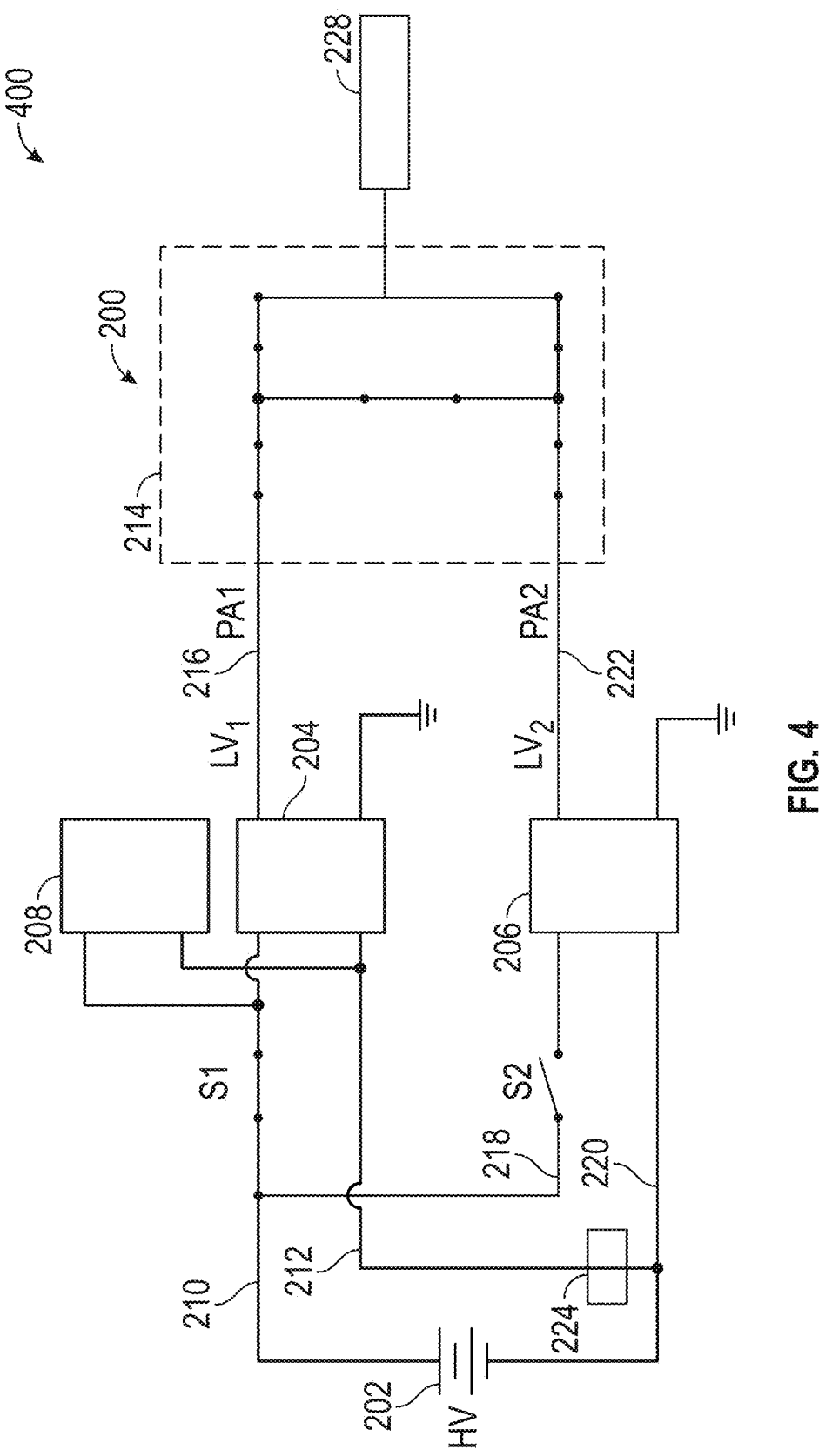
FIG. 4 is a diagram illustrating the power conversion system of FIG. 2 in an alternative current (AC) charging mode.

FIG. 4 is a diagram 400 illustrating the power conversion system 200 of FIG. 2 in an alternative current (AC) charging mode. The AC charging mode involves AC/DC charging of the HV power source 202 (Row 3 of Table 1). The OBCM 208 converts grid power to DC power to charge the HV power source 202. In the AC charging mode, the first switch S1 is in a closed configuration and the second switch S2 is in an open configuration. Power is provided from the OBCM 208 to charge the HV power source 202. Power can also be provided to the power aggregator 214 via the first APM 204. The second APM 206 is disconnected.

Figure 5:
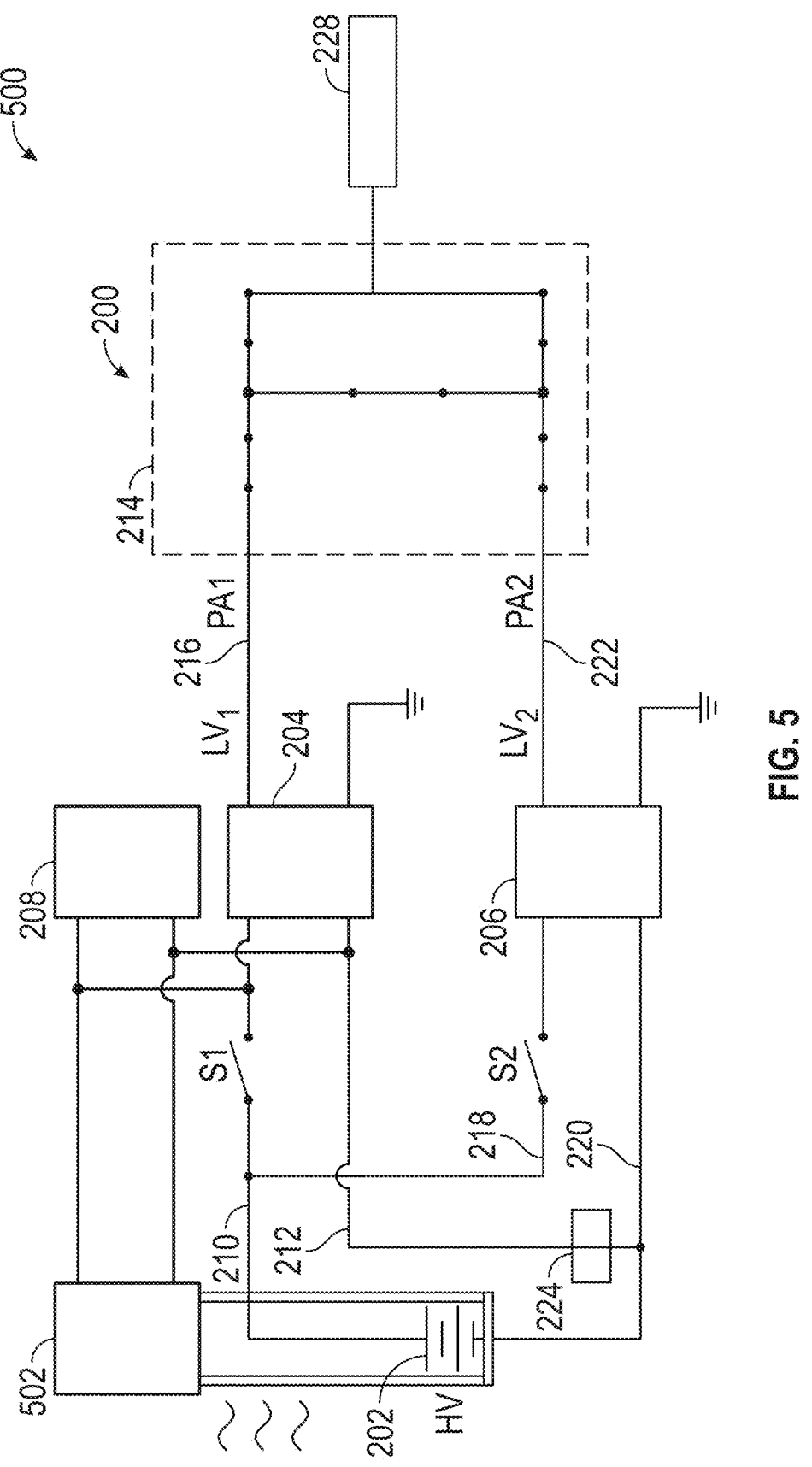
FIG. 5 is a diagram illustrating a battery heating mode of operation for the power conversion system of FIG. 2.

FIG. 5 is a diagram 500 illustrating a battery heating mode of operation for the power conversion system 200 of FIG. 2. The battery heating mode involves the OBCM 208 providing HV power to a coolant heater 502 to heat the cold HV battery (Row 4 of Table 1) and providing LV power to components of the LV system. The coolant heater 502 heats a coolant and circulates the current around the HV power source 202. The first switch S1 is in an open configuration and the second switch S2 is in an open configuration. The HV power source 202 is therefore disconnected from the first APM 204 and the second APM 206. The OBCM 208 provides HV power through the first APM 204 to the power aggregator 214 to support HV battery heating.

Figure 6:
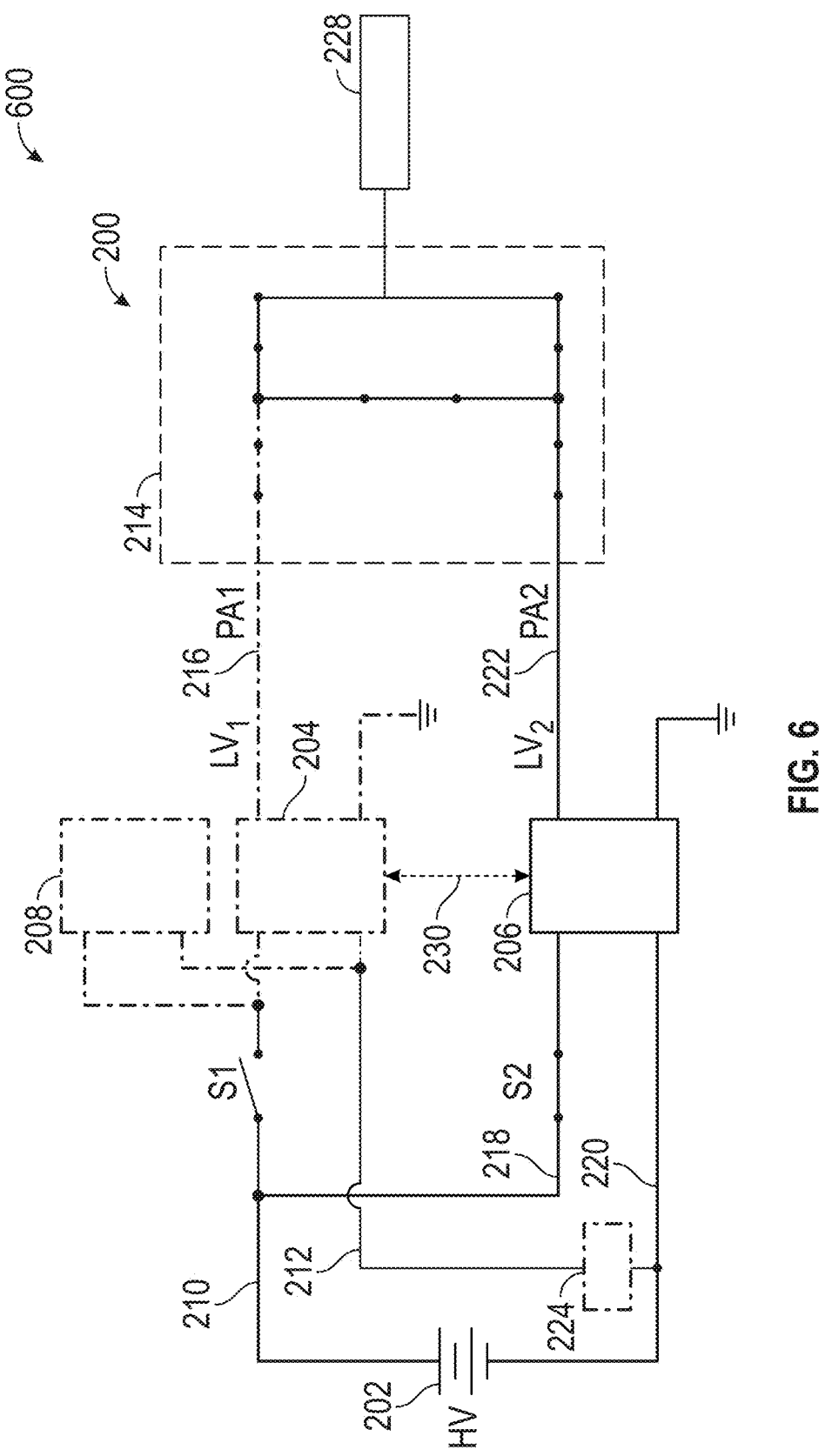
FIG. 6 is a diagram illustrating a battery failure mode of operation for the power conversion system of FIG. 2.

FIG. 6 is a diagram 600 illustrating a battery failure mode of operation for the power conversion system 200 of FIG. 2. The battery failure mode includes operation during and/or after an impact event (Row 5 and 6 of Table 1). During an impact event, the sensor 224 (i.e., pyro switch) can be activated to open the connection along the first HV negative bus line 212. Thus, in the battery failure mode, the first HV positive bus line 210 is in an open configuration and the second switch S2 is in a closed configuration. With the first HV positive bus line 210 in an open configuration, the OBCM 208 and other HV modules remain connected to the first APM 204. The first APM 204 can assist in the discharge of the OBCM 208 and other HV modules, including a Power Inverter Module (PIM), to discharge any high voltages stored at the OBCM, PIM and other HV modules. In general, the OBCM 208 can be discharged in a selected amount of time (e.g., about 4 seconds). The first APM 204 and the second APM 206 can communicate with each other during this mode to provide current balancing.

Meanwhile, the HV power source 202 remains electrically connected to the power aggregator 214 via the second APM 206. The HV power source 202 remains connected to provide power to the one or more low voltage batteries 228 and any low voltage loads that may be useful after an impact event.

Figure 7:
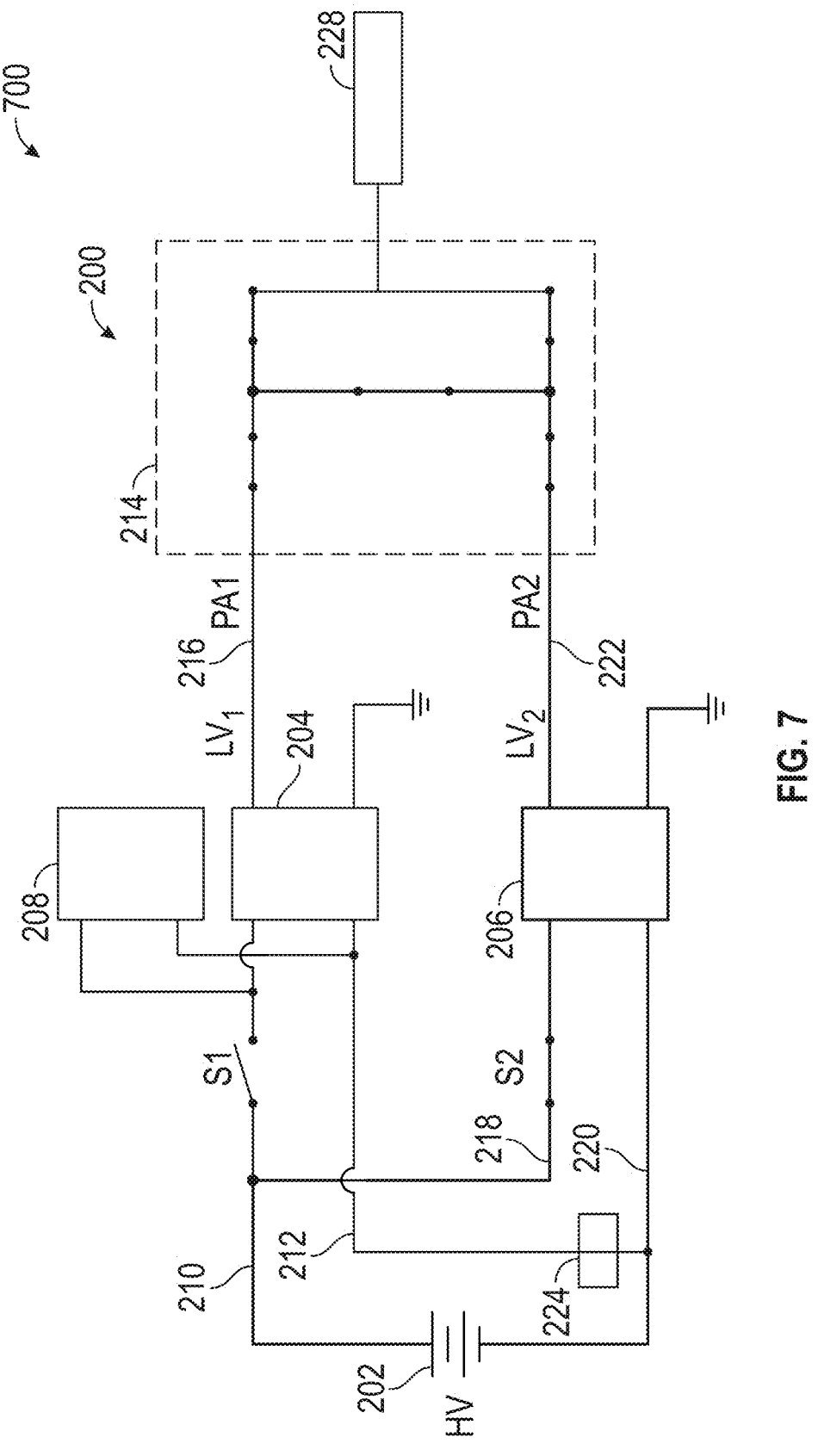
FIG. 7 is a diagram illustrating a key-off mode of operation for the power conversion system of FIG. 2.

FIG. 7 is a diagram 700 illustrating a key-off mode of operation for the power conversion system 200 of FIG. 2. This mode corresponds to Row 7 of Table 1. The first switch S1 is in an open configuration and the second switch S2 is a closed configuration. The key-off mode allows low voltage loads to be operated even when the vehicle is off or once a key-off signal has been received. Power is provided from the HV power source to the power aggregator 214 through the second APM 206. No power is provided through the first APM 204.

The first APM 204 and second APM 206 can be operated independently during the AC charging mode, the battery heating mode, and the key-off mode. The first APM 204 and second APM 206 can perform current balancing during the propulsion mode and the battery failure mode. Due to the current balancing, the second APM 206 can be used an equal amount as or even more than the first APM 204.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
   receiving a signal at a sensor of the vehicle during an impact event at the vehicle;
   switching a configuration of a first switch and a second switch of an electrical power system of the vehicle in response to receiving the signal, the electrical power system including:
   a high voltage power source;
   a first Accessory Power Module (APM) that converts between high voltage and low voltage;
   a first high voltage positive bus line connecting the high voltage power source to the first APM, wherein the first switch for controlling a connection between the high voltage power source and the first APM is disposed on the first high voltage positive bus line;

a second APM that converts between high voltage and low voltage;

a second high voltage positive bus line connecting the high voltage power source to the second APM, wherein the second switch for controlling a connectivity between the high voltage power source and the second APM is disposed on the second high voltage positive bus line; and an On Board Charging Module (OBCM) connected to the first high voltage positive bus line between the first switch and the first APM;

wherein switching the configuration includes placing the first switch in an open configuration and placing the second switch in a closed configuration.

2. The method of claim 1, further comprising operating a low voltage load via the second APM after the impact event, with the first switch open and the second switch closed.

3. The method of claim 1, further comprising discharging the high voltage positive bus line via the first APM after the impact event, with the first switch in the open configuration and the second switch in the closed configuration.

4. The method of claim 1, further comprising operating the vehicle in a propulsion mode by placing both the first switch and the second switch in the closed configuration.

5. The method of claim 1, further comprising charging the high voltage power source by placing the first switch in the closed configuration and placing the second switch in the open configuration.

6. The method of claim 1, further comprising performing current balancing between first APM and the second APM.

7. The method of claim 1, wherein the sensor is a pyro switch disposed along a first high voltage negative bus between the high voltage power source and the first APM.

8. A system for operating a vehicle, comprising:

a high voltage power source;

a first Accessory Power Module (APM) that converts between high voltage and low voltage;

a first high voltage positive bus line connecting the high voltage power source to the first APM;

a first switch disposed on the first high voltage positive bus line for controlling a connection between the high voltage power source and the first APM;

a second APM that converts between high voltage and low voltage;

a second high voltage positive bus line connecting the high voltage power source to the second APM;

a second switch disposed on the second high voltage positive bus line for controlling a connectivity between the high voltage power source and the second APM;

an On Board Charging Module (OBCM) connected to the first APM-first high voltage positive bus line between the first switch and the first APM;

a sensor for detecting an impact event at the vehicle and generating a signal upon detecting the impact event;

a processor configured to:

receive the signal from the sensor; and place the first switch in an open configuration and the second switch in a closed configuration in response to the signal.

9. The system of claim 8, wherein the processor is further configured to place the first switch in the closed configuration and the second switch in the closed configuration to operate the vehicle in a propulsion mode of operation of the vehicle.

10. The system of claim 8, wherein the processor is further configured to place the first switch in the closed configuration and the second switch in the open configuration to operate the vehicle in a charging mode.

11. The system of claim 8, wherein the processor is further configured to place the first switch in the open configuration and the second switch in the open configuration to allow heating of the high voltage power source of the vehicle via the OBCM.

12. The system of claim 11, wherein the processor is further configured to place the first switch in the open configuration and the second switch in the closed configuration upon receiving a key-off signal.

13. The system of claim 8, wherein the first APM and the second APM are configured to perform current balancing.

14. The system of claim 8, further comprising a pyro switch that disconnects the first APM from the high voltage power source in response to the impact event.

15. A vehicle, comprising:

a high voltage power source;

a low voltage power source;

a first Accessory Power Module (first APM) connected between the high voltage power source and the low voltage power source, wherein the first APM converts between high voltage and low voltage;

a first high voltage positive bus line connecting the high voltage power source to the first APM;

a first switch disposed on the first high voltage positive bus line for controlling a connection between the high voltage power source and the first APM;

a second APM connected between the high voltage power source and the low voltage power source, wherein the second APM converts between high voltage and low voltage;

a second high voltage positive bus line connecting the high voltage power source to the second APM;

a second switch disposed on the second high voltage positive bus line for controlling a connectivity between the high voltage power source and the second APM;

an On Board Charging Module (OBCM) connected to the first APM first high voltage positive bus line between the first switch and the first APM;

a sensor for detecting an impact event at the vehicle and generating a signal upon detecting the impact event;

a processor configured to:

receive the signal from the sensor; and place the first switch in an open configuration and the second switch in a closed configuration in response to the signal.

16. The vehicle of claim 15, wherein the processor is further configured to place the first switch in the closed configuration and the second switch in the closed configuration to operate the vehicle in a propulsion mode of operation of the vehicle.

17. The vehicle of claim 15, wherein the processor is further configured to place the first switch in the closed configuration and the second switch in the open configuration to operate the vehicle in a charging mode.

18. The vehicle of claim 15, wherein the processor is further configured to place the first switch in the open configuration and the second switch in the open configuration to allow heating of the high voltage power source of the vehicle via the OBCM.

19. The vehicle of claim 18, wherein the processor is further configured to place the first switch in the open configuration and the second switch in the closed configuration upon receiving a key-off signal.

20. The vehicle of claim 15, further comprising a pyro switch that disconnects the first APM from the high voltage power source in response to the impact event.

* * * * *